(No Model.)

T. L. KAUFFER.
ELECTRIC BATTERY.

No. 328,948. Patented Oct. 27, 1885.

WITNESSES.
H. E. Barry

INVENTOR.
Theodore L. Kauffer

UNITED STATES PATENT OFFICE.

THEODORE L. KAUFFER, OF BOSTON, MASSACHUSETTS.

ELECTRIC BATTERY.

SPECIFICATION forming part of Letters Patent No. 328,948, dated October 27, 1885.

Application filed September 4, 1885. Serial No. 176,162. (No model.)

*To all whom it may concern:*

Be it known that I, THEODORE L. KAUFFER, residing at Boston, in the county of Suffolk and Commonwealth of Massachusetts, have invented certain new and useful Improvements in Electric Batteries, of which the following is a full and complete specification.

My invention relates to an improvement in galvanic batteries, by which they are specially adapted for use in connection with the incandescent electric light; and it consists not only of a new depolarizing solution, but also in several other improvements, as hereinafter set forth.

Figure 1:
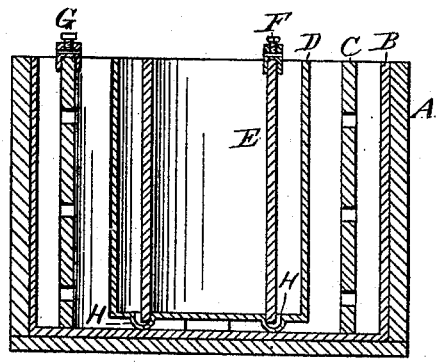
Figure 2:
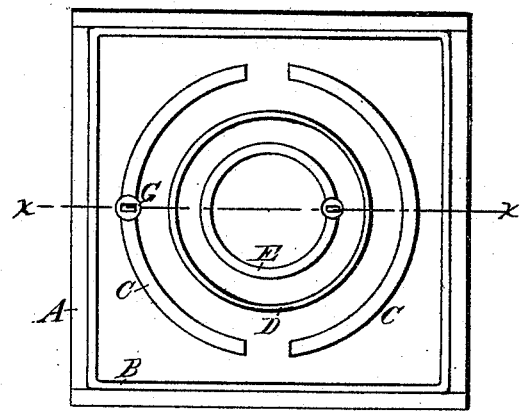
Figure 3:
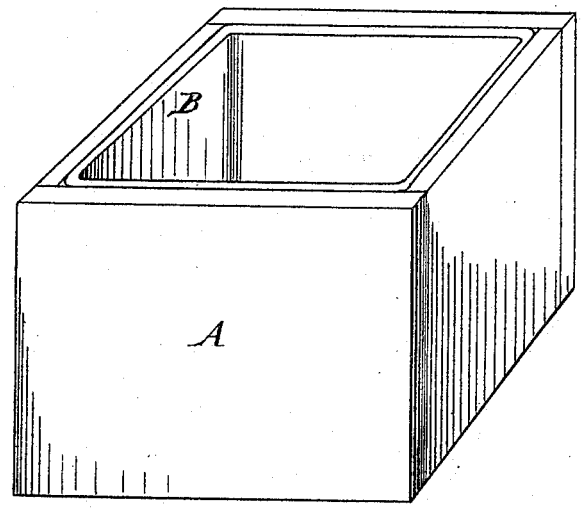
Figure 4:
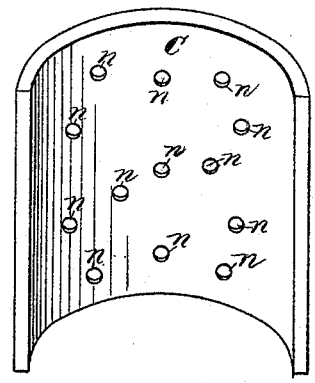
Figure 5:
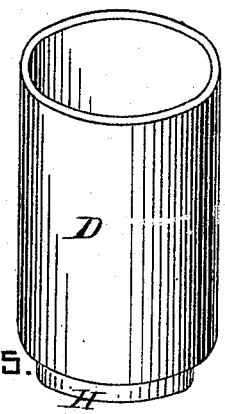
Figure 6:

In the accompanying drawings, Figure 1 is a sectional view of my improved battery with the several parts in their proper place on the line $x\ x$ of Fig. 2. Fig. 2 is a plan view of the same. Fig. 3 is a perspective view of my improved outer cell. Fig. 4 is a perspective view of my improved carbon plate. Fig. 5 is a front elevation of my improved inner porous cell. Fig. 6 is a front elevation of the zinc electrode.

The cell when completed consists of an outer jar, A, preferably of a square shape, and made of wood or any infrangible material. Within this outer box I place an inner box, B, made of paraffine, stearine, wax, or any similar substance. Within this is placed, resting on the bottom of the paraffine box, the carbon plate C C and the porous cell D. The zinc cylinder E is placed within the porous cell D. As I intend to use the cells in groups, I prefer the square shape for compactness.

I have made the outer cell of the materials named, and in the manner shown, as I desire to adapt it specially for transportation, and for use in cars and other positions where glass or other similar fragile material would be likely to be broken.

The carbon plates C C, I make of the shape shown, and perforate the same with holes to allow a free circulation for the depolarizing solution. The porous cup D, I provide with a grooved bottom, which has the various functions of supporting the cup, holding the zinc cylinder in place, and affording an economical receptacle for the free mercury used for renewing the amalgamation of the zinc element.

I coat the inner surface of the zinc cylinder with paraffine or other similar material, in order to prevent waste and stop any chemical action on this inner surface.

In setting up my improved battery I place in the porous cup D, with the positive element, the cylinder of zinc E, a solution composed of one part sulphuric acid, five parts of water. In groove H, I place a similar amount of mercury to keep the zinc continuously amalgamated. The outer jar I partially fill with a depolarizing solution consisting of common salt, bichromate of soda, an acid, preferably sulphuric acid, and water. The proportions in which I preferably make this solution are one-half pound of common salt, four pounds of bichromate of soda, eight pounds of sulphuric acid, and eight pounds of water. This depolarizing solution, which I use in the outer jar, is new with me. I have found that by adding common salt to a fluid consisting of bichromate of soda, an acid, preferably sulphuric, in an aqueous solution, that free chlorine is produced, which is a powerful depolarizing agent.

F represents the negative pole, and G the positive pole.

With a cell constructed as I have herein described, I am enabled to produce a battery which has great electro-motive force and constancy and hardly any internal resistance.

I claim as my invention—

1. A galvanic battery consisting of an outer cell, an inner porous cup, a positive and negative electrode, bichromate of soda, and common salt with an acid, preferably sulphuric acid, in aqueous solution.

2. In a galvanic battery, an outer cell consisting of the outer box, preferably made of an infrangible material, as wood, and an inner box, preferably made of paraffine or other similar material, substantially as described.

3. In a galvanic battery, a porous cell provided with a grooved bottom, said groove being constructed to hold free mercury and the zinc element and support the porous cell, substantially as described.

4. A galvanic battery consisting of an outer cell, an inner porous cup, a positive and negative electrode, bichromate of soda with an acid, preferably sulphuric acid, in aqueous solution, the said positive electrode being a cylinder of zinc and having its inside surface coated with paraffine, as and for the purpose substantially as described.

5. A galvanic battery consisting of the outer cell constructed by the combination of the outer box of an infrangible material with an inner box of paraffine, the negative element, the porous cup, the positive element, and the charging liquid, arranged substantially as shown and described, and for the purpose set forth.

6. In a galvanic battery, a depolarizing fluid, two elements of which are bichromate of soda and common salt.

7. The combination, in a galvanic battery, of the electrodes, a mixture of bichromate of soda and salt with an acid, preferably sulphuric acid, in an aqueous solution.

In witness whereof I have hereunto set my hand.

THEODORE L. KAUFFER.

Witnesses:
WM. B. H. DOWSE,
JAS. H. HOWARD.